United States Patent

Klesen et al.

[11] Patent Number: 5,979,292
[45] Date of Patent: Nov. 9, 1999

[54] METHOD OF OPERATING A PNEUMATIC BRAKE BOOSTER

[75] Inventors: Christof Klesen, Modautal; Jochen Führer, Darmstadt; Michael Vogt, Simmern; Heinz Zingel, Bad Camberg; Thorsten Neu, Löhnberg; Michael Zydek, Langgöns; Stefan Krebs, Eschborn; Thomas Berthold, Darmstadt, all of Germany

[73] Assignee: ITT Manufacturing Enterprises Inc., Wilmington, Del.

[21] Appl. No.: 09/051,429

[22] PCT Filed: Nov. 5, 1996

[86] PCT No.: PCT/EP96/04828

§ 371 Date: Jul. 2, 1998

§ 102(e) Date: Jul. 2, 1998

[87] PCT Pub. No.: WO97/17239

PCT Pub. Date: May 15, 1997

[30] Foreign Application Priority Data

Nov. 6, 1995 [DE] Germany ............... 195 41 101

[51] Int. Cl.[6] .............. F15B 13/16; F15B 9/10
[52] U.S. Cl. ............ 91/367; 91/376 R; 60/547.1
[58] Field of Search .................. 91/367, 369.1, 91/376 R; 60/547.1

[56] References Cited

U.S. PATENT DOCUMENTS

| | | | |
|---|---|---|---|
| 4,505,351 | 3/1985 | Nishikawa et al. | 91/367 X |
| 4,966,420 | 10/1990 | Schiel et al. | 60/547.1 X |
| 5,096,267 | 3/1992 | Volz | 91/367 X |
| 5,168,790 | 12/1992 | Konishi | 91/376 R X |
| 5,390,497 | 2/1995 | Cottam | 60/547.1 X |

FOREIGN PATENT DOCUMENTS

| | | |
|---|---|---|
| 4028290 | 1/1962 | Germany . |
| 2839291 | 3/1980 | Germany . |
| 4238333 | 5/1990 | Germany . |
| 4405092 | 12/1994 | Germany . |
| 4324205 | 1/1995 | Germany . |
| 93/24353 | 12/1993 | WIPO . |

*Primary Examiner*—Hoang Nguyen
*Attorney, Agent, or Firm*—Rader, Fishman & Grauer PLLC

[57] ABSTRACT

In a method of operating an electromechanically actuatable pneumatic brake booster, an electromagnet which actuates a sealing seat of its control valve is energized in an interval by a short current pulse of maximum current strength with a subsequent ramp-like current rise, and the current being furnished to the electromagnet is decreased when a fixed value of the pressure that prevails in a master brake cylinder connected downstream of the brake booster is reached. When the hydraulic pressure introduced into the master brake cylinder reaches a nominal value, the current being furnished to the electromagnet is supplied by a pressure controller which maintains the hydraulic pressure constant.

3 Claims, 3 Drawing Sheets

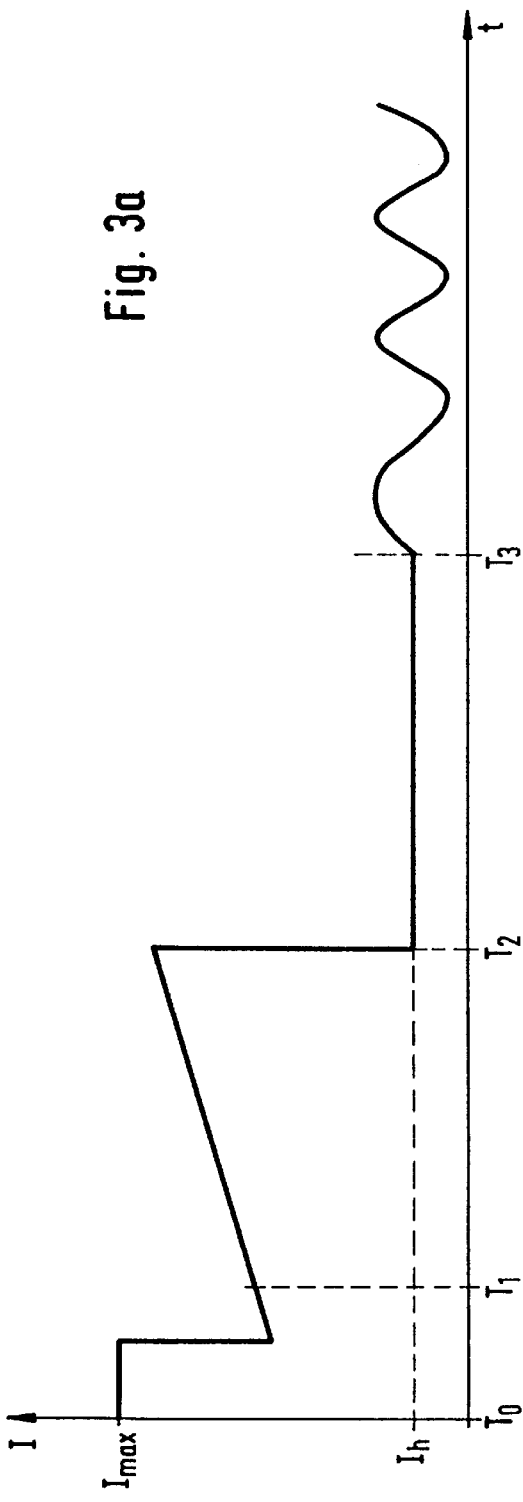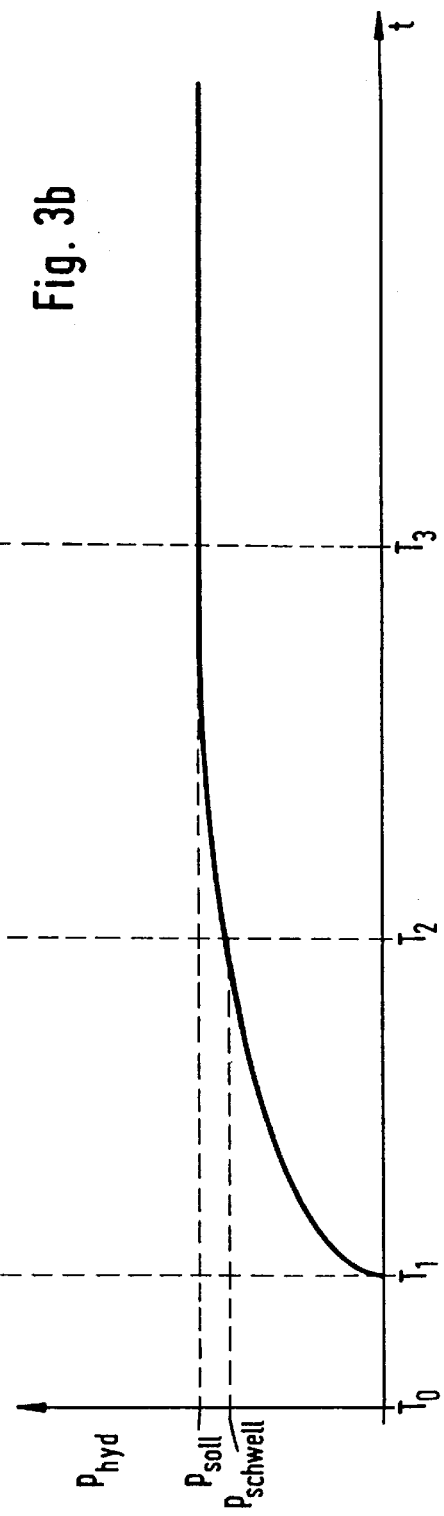

METHOD OF OPERATING A PNEUMATIC BRAKE BOOSTER

The present invention relates to a method of operating a pneumatic brake force booster which includes a booster housing having its interior subdivided by a movable wall into a first chamber (vacuum chamber) and a second chamber (working chamber), and a control housing accommodating a control valve that controls a pneumatic pressure differential which acts upon the movable wall, the control valve comprising a first sealing seat that is operable by an actuating rod and, when opened, permits ventilating the working chamber, a second sealing seat which, when opened, permits a connection between the two chambers, and an elastic valve member which interacts with the two sealing seats, wherein the first sealing seat or another sealing seat interacting with the valve member is operable independently of the actuating rod to the effect of ventilating the working chamber by an electromagnet actuatable by an electronic control unit, and wherein the hydraulic pressure is determined which is introduced into a master brake cylinder connected downstream of the brake force booster.

International patent application WO 93/24353 discloses a method of this type. When the method known in the art is implemented, a memorized nominal braking pressure value is constantly associated with the instantaneous actuating speed of a brake pedal actuating the brake force booster and compared with a measured actual braking pressure value. The brake force booster is driven in response to the comparison result. A disadvantage of the prior art method is that the pressure values are preset by evaluation of the brake pedal movement so that a mere independent activation (which is carried out without operation of the brake force booster by the driver) cannot be realized. Thus, the system for implementing the known method is inappropriate for use in some applications, for example, as a hill holder, for precharging the hydraulic brake system, or for collision avoidance. A pneumatic brake force booster with electromagnetic auxiliary control is disclosed in German patent No. 44 05 092 wherein the first sealing seat is provided on a cylindrical sleeve which is connected to the armature of an electromagnet arranged in the control housing. To permit operation of the prior art brake force booster by the driver, there is provision of a valve piston which is in a force-transmitting connection with the actuating rod. The armature is axially supported on the valve piston and may thus be entrained by the valve piston upon operation by the driver. In the event of independent activation, or energization of the electromagnet, the first sealing seat will lift from the valve member, thereby permitting the atmosphere to flow into the working chamber.

German patent application No. 42 38 333 discloses a vacuum brake force booster having a control valve which is includes a third sealing seat that is operable by an electromagnet and replaces the second sealing seat in terms of effect in an independent activation. The control valve is operated by the electromagnet in opposition to the direction of operation by the driver so that the valve member is moved away from the first sealing seat on the valve piston by displacement of the third sealing seat.

Therefore, an object of the present invention is to disclose a method of operating pneumatic force boosters of the above mentioned generic type which permits a quick pressure increase to a desired value and obviates the need for operation of the brake force booster by the driver. Preferably, the desired pressure value is below the limit which is maximally achievable by the independent activation.

According to the present invention, this object is achieved because the electromagnet is actuated by way of an invariably predefined current variation, and after a fixed pressure value in the master brake cylinder is reached, the hydraulic pressure is controlled by variations of the electric current being fed to the electromagnet. To specify the idea of the present invention, a) the electromagnet is actuated by way of a current pulse of a maximum current strength without influencing the control valve,
b) whereupon the current being supplied to the electromagnet is slope-like increased beyond the opening of the first or the further sealing seat until the fixed pressure value in the master brake cylinder is reached,
c) subsequently, the current is reduced to a value where the pneumatic pressure that prevails in the booster housing remains constant and the hydraulic pressure in the master brake cylinder rises simultaneously, and d) the current value adjusted in step c) is varied so that the pressure introduced into the master brake cylinder corresponds to a nominal value produced by the electronic control unit.

The current value adjusted in step c) is preferably varied so that the pressure introduced into the master brake cylinder remains constant.

The present invention will be explained in detail in the following description of an embodiment, making reference to the accompanying drawings.

In the drawings,

FIG. 3 is a diagram showing an independent activation of the brake force booster shown in FIG. 2, especially the time variations of the current supplied to the electromagnet of the brake force booster (FIG. 3a) and the pressure increase in the master brake cylinder connected downstream of the brake force booster (FIG. 3b).

Figure 1:
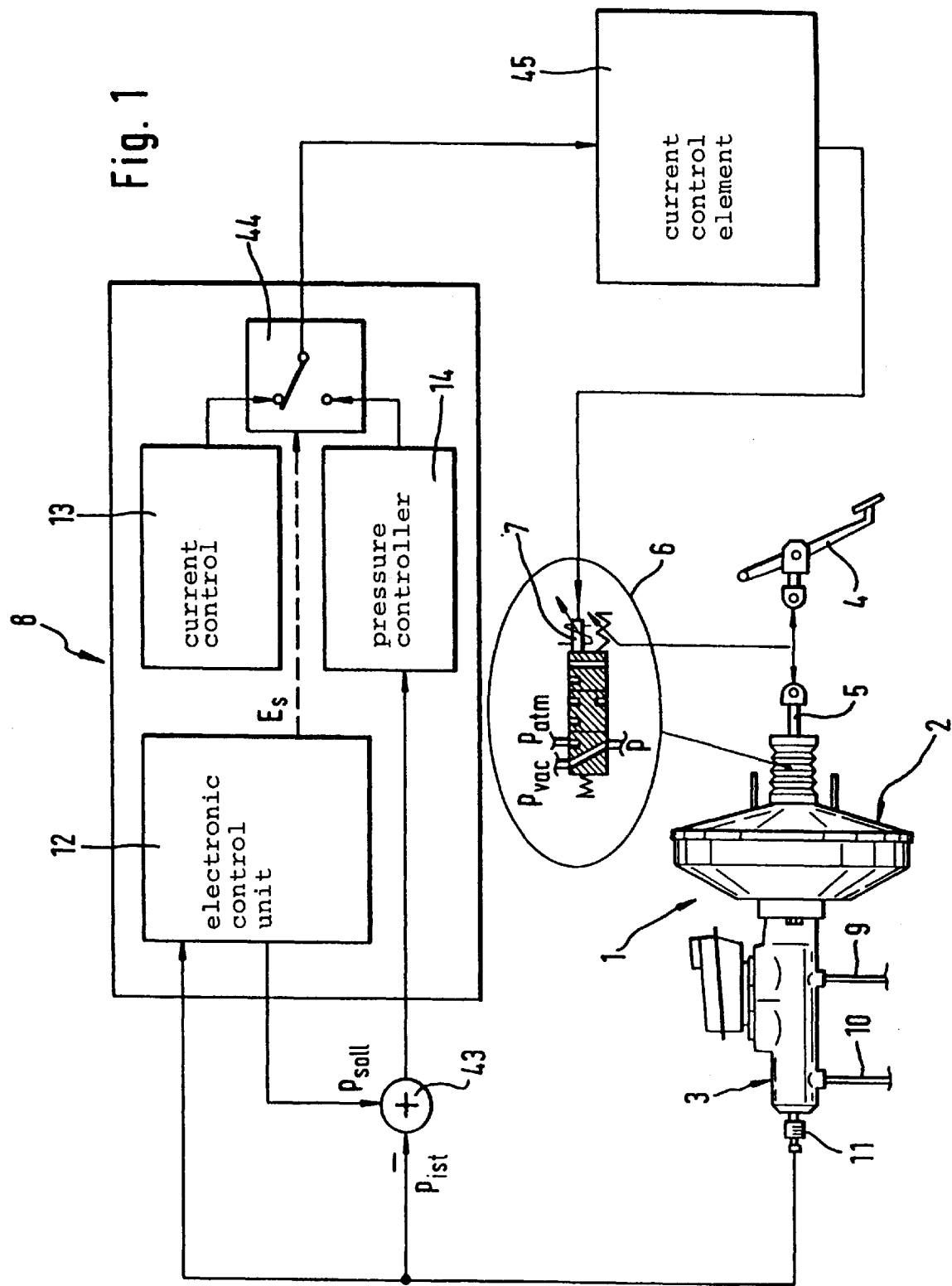
FIG. 1 is a greatly simplified view of a brake system design for implementing the method of the present invention.

The brake system for automotive vehicles shown in the embodiment of FIG. 1 mainly comprises an actuating unit 1, an electronic control device 8 and non-illustrated wheel brakes of an automotive vehicle. The actuating unit 1, in turn, includes a pneumatic brake force booster, preferably a vacuum brake force booster 2, which is operable both by an actuating pedal 4 and independently of the actuating pedal 4. Connected downstream of booster 2 is a master brake cylinder, preferably a tandem master cylinder 3, having pressure chambers (not shown) which are connected to the wheel brakes by way of hydraulic lines 9, 10. An actuating rod 5 which is used to mechanically actuate a control valve 6 (shown only schematically) is coupled to the actuating pedal 4. Control valve 6 controls the increase and decrease of a pneumatic differential pressure in the housing of the vacuum brake force booster 2. An electromagnet 7 permits an (independent) activation of the control valve 6 independently of the actuating force which is introduced on the actuating rod 5 by the driver of the vehicle. The electromagnet 7 is actuated by actuating signals of the electronic control device 8 by way of a current control element 45, the structure of which will be explained in the following text. A pressure sensor 11 connected to one of the pressure chambers of the tandem master cylinder 3 senses the hydraulic pressure introduced into the tandem master cylinder 3.

The electronic control device 8 generally includes an electronic control unit 12, a current control 13 and a pressure controller 14. The electronic control unit 12 to which the output signal $p_{ist}$ of the above mentioned pressure sensor 11 is sent, produces a nominal pressure signal $p_{soll}$ which is compared in a comparator circuit 43 with the actual value signal $p_{ist}$ representative of the hydraulic pressure that prevails in the master brake cylinder 3. The comparison result is sent as an input quantity to the pressure controller 14. Further, the control unit 12 produces control signals $E_s$ as a function of the actual pressure value $p_{ist}$. The control signals are taken into account for deciding whether the electromagnet 7 shall be actuated by the current signals $I_s$ of the current control 13 or by the output signals $I_p$ of the pressure controller 14. The mentioned change-over function is represented by the illustration of a selector switch 44.

Figure 2:
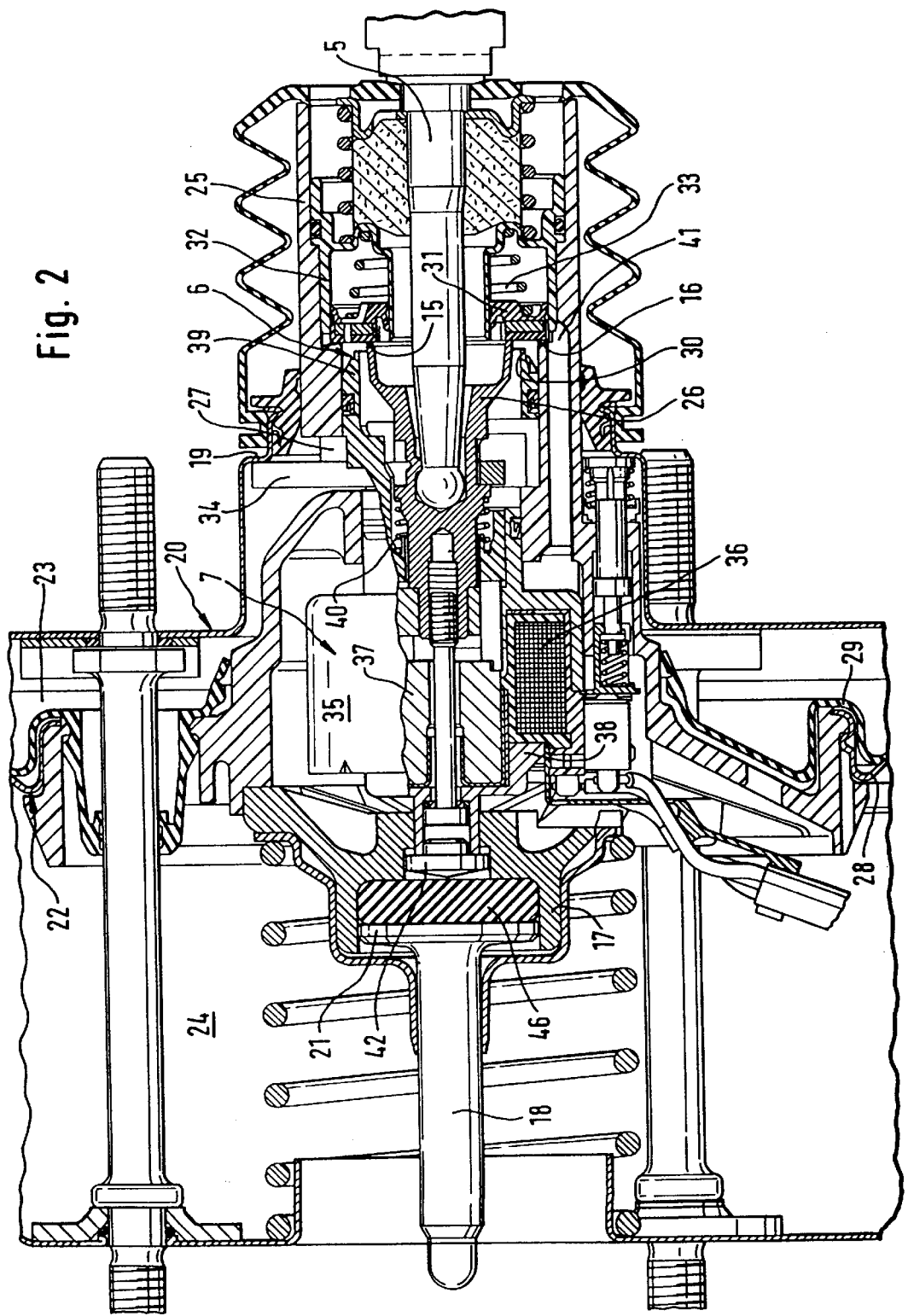
FIG. 2 is a longitudinal cross-sectional view, partly broken off, of an independently activatable brake force booster in the inactive stand-by position.

FIG. 2 shows an embodiment of an independently activatable vacuum brake force booster which can be used for the mentioned pressure control purposes. The booster housing 20 (represented only schematically) of the brake force booster is subdivided by an axially movable wall 22 into a working chamber 23 and a vacuum chamber 24. The axially movable wall 22 includes a diaphragm plate 28, deep drawn from sheet metal, and a flexible diaphragm 29 (not shown) abutting on the plate. The diaphragm, configured as a rolling diaphragm, provides a sealing between the outside periphery of the diaphragm plate 28 and the booster housing 20.

The control valve 6, mentioned with respect to FIG. 1, is operable by the actuating rod 5 and accommodated in a control housing 25, which is sealed and guided in the booster housing 20 and carries the movable wall 22. The control valve 6 is composed of a first sealing seat 15 provided on a valve piston 26 coupled to the actuating rod 5, a second sealing seat 16 provided in the control housing 25, a third sealing seat 30 interposed radially between the two sealing seats 28, 29, and an annular valve member 31 cooperating with the sealing seats 15, 16, 30. Valve member 31 is guided in a guide part 32 sealed in control housing 25 and is biassed against the valve seats 15, 16, 30 by a valve spring 33 that is supported on the guide part 32. The working chamber 3 is connectable to the vacuum chamber 4 through a channel 41 which extends laterally in the control housing 25.

By way of a rubber-elastic reaction disc 36 abutting on the frontal end 17 supported on the control housing 25 and a push rod 18 including a head flange 21, the brake force is transmitted onto an actuating piston of a non-illustrated master cylinder of the brake system. The master brake cylinder is arranged on the vacuum-side booster housing half not shown.

To connect the working chamber 3 to the atmosphere when the control valve 6 is actuated, a channel 27 which extends in a generally radial direction is provided in the control housing 25. The return movement of the valve piston 26 at the end of a braking operation is limited by a transverse member 34 which, in the release position of the vacuum brake power booster shown in the drawing, abuts on a stop 19 provided in the booster housing 1.

To initiate an independent activation of the brake force booster shown in FIG. 2 irrespective of the actuating rod 5, the electromagnet 7 mentioned with respect to the FIG. 1 embodiment is preferably arranged in a housing 35 rigidly connected to the valve piston 26. The result is that the electromagnet 7 is displaceable along with the valve piston 26 in the control housing 25. The electromagnet 7 includes a coil 36 accommodated within the housing 35 and an axially slidable cylindrical armature 37. Armature 37 is partly guided in a closure member 38 closing the housing 35. A force-transmitting sleeve 39 which carries the above-mentioned third sealing seat 30 is supported on armature 37.

Interposed between the valve piston 26 and the force-transmitting sleeve 39 is a compression spring 40 which maintains the armature 37 in its initial position where the third sealing seat 30 is axially offset with respect to the first sealing seat 15 provided on the valve piston 26. The closure member 38 guided in the control housing 25, by the intermediary of a transmission disc 42, bears against the above mentioned reaction disc 36 and permits transmitting the input force introduced on the actuating rod 5 to the reaction disc 36.

As can be seen in the diagram of FIG. 3, a short pulse of maximum current strength with a subsequent slope-like current rise is applied to the electromagnet 7 of the brake force booster shown in FIG. 2 at the commencement of an independent activation (time $T_0$). Thus, the electromagnet 7 is actuated so that the third sealing seat 30 in the first time interval $T_0$-$T_1$ quickly moves towards the valve member 31 until it abuts thereon and bridges the above-mentioned second sealing seat 16 in terms of effect. Upon further movement of the third sealing seat 30, seat 30 is initially urged into the material of the valve member 31 in the actuating direction of the electromagnet 7, i.e. in opposition to the actuating direction of the brake force booster and, subsequently, displaces valve member 31 away from the first sealing seat 15. The result is that a slot is produced at time T1 between the valve member 31 and the first sealing seat 15 which enlarges with the current rise and permits inflow of the atmosphere into the working chamber 23. In the above described operation where the second sealing seat 16 is replaced by the third sealing seat 30 in terms of effect, pressure is increased in the master brake cylinder 3 connected downstream of the brake force booster 2 until a threshold value $P_{schwell}$ is reached at time T2 when the current supplied to the electromagnet 7 is decreased to a constant value $I_h$ and maintained on this value for a fixed period (until time T3). In this interval, the hydraulic pressure introduced in the master brake cylinder 3 rises to the nominal value $P_{soll}$ predefined in the electronic control unit 12 (FIG. 1). Preferably, the value $I_h$ is chosen to be of such a quantity that the third sealing seat 30 moves until the valve member 31 closes the first sealing seat 15 again, the third sealing seat 16, however, remains closed. The current sent to the electromagnet 7 was supplied by the functional block 'current control' 13 in the interval T0 to T3 (FIG. 1). At time T3 when the hydraulic pressure has reached its nominal value, the electronic control unit 12 produces the change-over signal $E_s$ which causes a change-over from the current control 13 to the pressure controller 14, if necessary, a P-controller. The control algorithm included in the pressure controller 14 adjusts the current supplied to the electromagnet 7 so that the hydraulic pressure $P_{hyd}$ in the master brake cylinder 3 remains constant. As has already been mentioned, the hydraulic pressure which prevails in the master brake cylinder 3 is used as a reference input or nominal value, and the pressure controller 14 reads in the pressure value Psoll which prevails upon expiry of the interval T0 –T3.

We claim:

1. A method of operating a pneumatic brake booster which includes a booster housing having its interior subdivided by a movable wall into a first chamber and a second chamber, and a control valve that controls a pneumatic pressure differential which acts upon the movable wall, the control valve comprising a first sealing seat that is operable by an actuating rod and, when opened, permits ventilating the second chamber, a second sealing seat which, when opened, permits a connection between the two chambers, and a valve member which interacts with the two sealing seats, one of the sealing seats being operable independently of the actuating rod to the effect of ventilating the second chamber by an electromagnet actuatable by an electronic control unit, wherein the hydraulic pressure is determined which is introduced into a master brake cylinder connected downstream of the brake booster, and wherein the electromagnet is actuated by way of an invariably predefined current variation, and, after a fixed pressure value in the master brake cylinder is reached, the hydraulic pressure is controlled by variations of the electric current being fed to the electromagnet.

2. The method as claimed in claim 1, including the steps of actuating the electromagnet by way of a current pulse of a maximum current strength without influencing the control valve;

thereupon slope-like increasing the current being supplied to the electromagnet beyond the opening of the first or the further sealing seat until the fixed pressure value in the master brake cylinder is reached;

subsequently reducing the current to an adjusted value where the pneumatic pressure that prevails in the booster housing remains constant and where the hydraulic pressure in the master brake cylinder rises simultaneously; and varying the adjusted current value so that the pressure introduced into the master brake cylinder corresponds to a nominal value produced by the electronic control unit.

3. The method as claimed in claim 2, wherein the adjusted current value is varied so that the pressure introduced into the master brake cylinder remains constant.

* * * * *